Dec. 10, 1963  R. M. HEINTZ  3,113,561
STRATIFIED CHARGE TWO-CYCLE ENGINE
Filed Jan. 10, 1961  4 Sheets-Sheet 1

FIG-1

INVENTOR.
RALPH M. HEINTZ
BY
Lippincott, Ralls & Hendricson
ATTORNEYS

Dec. 10, 1963 R. M. HEINTZ 3,113,561
STRATIFIED CHARGE TWO-CYCLE ENGINE
Filed Jan. 10, 1961 4 Sheets-Sheet 2

INVENTOR.
RALPH M. HEINTZ
BY
Lippincott, Ralls & Hendrickson
ATTORNEYS

Dec. 10, 1963      R. M. HEINTZ      3,113,561
STRATIFIED CHARGE TWO-CYCLE ENGINE
Filed Jan. 10, 1961      4 Sheets-Sheet 3

INVENTOR.
RALPH M. HEINTZ
BY
Lippincott, Ralls & Hendricson
ATTORNEYS

United States Patent Office 3,113,561
Patented Dec. 10, 1963

3,113,561
STRATIFIED CHARGE TWO-CYCLE ENGINE
Ralph M. Heintz, P.O. Box 546, Los Gatos, Calif.
Filed Jan. 10, 1961, Ser. No. 81,793
20 Claims. (Cl. 123—65)

This invention relates to internal combustion engines, particularly automobile engines. Among its objects are these: to provide an automobile engine about one-third smaller and less expensive than engines of equal power in common present use; to provide a high-compression gasoline engine that gives high performance with non-premium fuel; to provide an internal combustion engine in which substantially complete combustion of the fuel occurs under all operating conditions, including idling, low-power, and high-power operation, which not only achieves exceptional efficiency and fuel economy, but also reduces to a minimum contamination of the atmosphere with irritating and noxious products of partial combustion, i.e., smog; to provide an improved engine having negligible pump losses, particularly in idling and low-power operation (automobiles operate in the low-power range most of the time), which further increases fuel economy; to provide an internal combustion engine in which the compression ratio and the temperature of combustion remain substantially the same during idling and low-power operation as in high-power operation, resulting in still better efficiency and fuel economy; to provide a two-cycle engine that idles smoothly and at exceptionally low speed; and to provide a simple, yet effective, means for supercharging a two-cycle engine.

Figure 1:
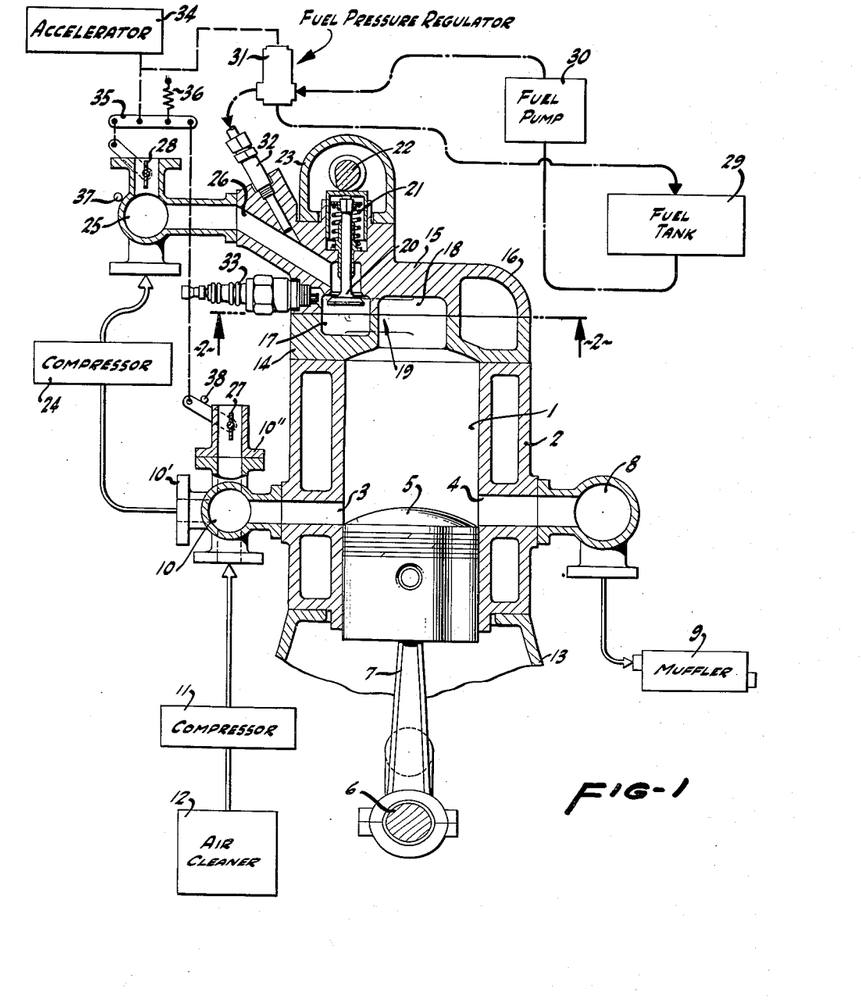
FIG. 1 of the drawings is a diagrammatic illustration of the fuel and air induction system of an engine embodying the invention, the engine itself being illustrated in a sectional view of one cylinder and parts associated therewith.

The foregoing and other objects and advantages are achieved by the methods and structures herein disclosed and claimed. A two-cycle engine having the usual air inlet and exhaust ports in the cylinder walls is additionally provided with an auxiliary charging and ignition chamber opening into the top of each cylinder. (Throughout this specification, the end of the cylinder that is closed by the head is referred to as the top—that is, the engine will be assumed to be oriented as shown in FIG. 1 of the drawings, although in practice the engine may be mounted with various orientations of the cylinders.) Each auxiliary chamber is preferably of special form, comprising two, side-by-side, hollow cylindrical cells connected through a passage that is tangential to the cylindrical walls of both cells. An intake valve opens into the top end of the first cell, and the bottom end of the second cell opens into the top end of the cylinder. Two air compressors are employed: one forces air through the conventional air inlet port in the cylinder wall; and the second, preferably connected in tandem with the first, supplies air through the intake valve into the first cell of the auxiliary chamber. Liquid fuel, e.g., gasoline, is also introduced through the intake valve into the auxiliary chamber, and the mixture of fuel and air is ignited with in said first cell, expands into the second cell, acquiring a rapid rotary motion as it does so, and further expands downward into the cylinder wherein combustion is completed.

The first compressor is connected to the inlet ports in the cylinder walls in parallel with a first spill valve, so that opening the first spill valve reduces the amount of air supplied through the inlet ports into the cylinders. Likewise, the second compressor is connected to the intake valves of the auxiliary chambers in parallel with a second spill valve. When the motor is idling or operating at reduced power, the first spill valve is fully opened and the amount of air supplied through the inlet ports in the cylinder walls is practically negligible; also there is little load on the essentially unloaded first compressor, and consequently, relatively little power is needed to drive this compressor. The second spill valve is at least partly open when the engine is idling, and is progressively closed as the power is increased up to about one-fourth to one-third of the peak power of the engine, at which point the second spill valve is fully closed. Sufficient air and fuel for idling and up to as much as one-third of peak power are thus supplied through the intake valves to the auxiliary chambers. The amount of fresh air so introduced through the intake valves fills less than one-third of each cylinder; during idling and low power operation the remaining space within the cylinders is filled with retained hot exhaust gases, which when highly compressed are still further heated, whereby the combustion temperature is kept high even during idling. The undesirable flame-quenching action, which results from the large excess of cold, fresh air as ingested, for instance, by conventional two-cycle diesel engines during idling, resulting in incomplete combustion and the copious production of noxious fumes, is largely eliminated by the described retention of exhaust gases. A four-cylinder, two-cycle engine embodying the present invention idles smoothly even at exceptionally low idling speeds, e.g., down to 200 r.p.m. (revolutions per minute) on two-cylinder operation (fuel supplied to only two of the four cylinders), with a fuel consumption less than one-tenth gallon per hour, and with a clean exhaust.

To increase the output power, the fuel supply is increased to provide more fuel through the intake valves and into the auxiliary chambers. Concurrently, from idling up to about one-fourth to one-third of peak power, the second spill valve is progressively closed to supply more air through the intake valves to the auxiliary chambers. When the second spill valve is fully closed, all of the air discharged by the second compressor (sufficient air to operate the engine at one-fourth to one-third of peak power) passes through the intake valves into the auxiliary chambers. As power is further increased by increasing the fuel supply, the first spill valve is progressively closed to supply additional air through the inlet ports in the cylinder walls. In this way, a balance of fuel and air is maintained such that there is an excess of air in the cylinders to burn the fuel, and thus a more clearly complete combustion of the fuel is achieved. In other words, the charge is leaner than a stoichiometric one.

These and other aspects of the invention may be understood better from the following illustrative description and the accompanying drawings.

Although but one cylinder is illustrated in the drawings, it is usually desirable to provide at least two, which will be equivalent in smoothness of power flow to a four-cylinder, four-cycle engine. The particular engine that served as a model for FIG. 1–3 of the drawings actually has three cylinders. An especially desirable arrangement for automotive use appears to be a four-cylinder, two-cycle engine, with provisions for operating only two cylinders during idling and low power outputs, as illustrated in FIGS. 4–7.

These engines have three different modes of operation, herein called Mode I, Mode II, and Mode III. During idling and up to about one-fourth of peak power, the first spill valve is fully open, the amount of air supplied through the inlet ports in the cylinder walls is practically negligible, and the engine operates in Mode I. In this mode, the maximum power that can be obtained from the engine is determined solely by the amount of fresh air that can be passed through the intake valves into the auxiliary chambers. Because all, or nearly all of the air discharged by the first compressor is spilled, and little or none is passed through the inlet ports in the cylinder walls, the power consumed in the first compressor is relatively small. Of course, now the maximum power obtainable from the engine is low, about one-third to one-fourth of peak power; however, burned gases can pass out of the exhaust port only in proportion to fresh charge passed through the inlet valves, so at least two-thirds to three-fourths of the exhaust gas is retained and recirculated within the cylinder under the above conditions. At idling, as much as 95% of the exhaust gases may be recirculated. Thus a fuel molecule that remains unoxidized in one cycle is recirculated and exposed to excess oxygen molecules more than once, is heated by compression more than once, and is heated by combustion of other fuel particles more than once.

Under idling conditions, there is a high probability, statistically, that a fuel molecule will be exposed to several oxygen molecules and to ignition heat and pressure as many as twenty times before it can pass out of the exhaust port and into the atmosphere. Even at one-fourth of peak power, which is commonly enough power to drive an automobile at maximum legal highway speed, there is a high probability, statistically, that a fuel molecule will be exposed to oxygen, heat, and pressure at least four times before being discharged into the atmosphere. Thus, the statistical probability of an unburned fuel molecule being exhausted into the atmosphere is very low. The emphasis during the research that evolved the subject engine was on insuring a clean, non-noxious, completely oxidized exhaust rather than on economy. This has been achieved to a significant degree. The high efficiency and great economy resulting from the almost complete combustion effected by this engine are very welcome by-products.

When the power demand exceeds that obtainable from Mode I operation, the engine operates in Mode II, wherein additional air is introduced into the charge through the inlet ports in the cylinder walls, permitting more fuel to be added, and thus obtaining more power. The discharge of the first compressor, which was almost all dumped into the atmosphere through the first spill valve during Mode I operation, is now directed into the cylinders by closing the first spill valve. As this valve is progressively closed, more air passes through the inlet ports in the cylinder walls at the base of each cylinder, and this air is added to the charge of fuel and air supplied to the cylinders. As the air flow is increased, additional fuel is admitted with the air forced into the auxiliary chamber through the intake valves; however, the total air is kept somewhat in excess of that needed for combustion, so that the fuel is almost completely consumed.

As the first spill valve is moved from its fully open position, the back-pressure caused by the flow of air through the inlet ports into the cylinders increases and becomes a maximum when the first spill valve is fully closed. At the end of Mode I operation, and throughout Mode II operation, the second spill valve is fully closed and the entire discharge of the second compressor passes through the inlet valves into the auxiliary chambers. The back-pressure from the first compressor now appears at the suction side of the second compressor, causing this second compressor to become a second-stage or booster compressor. The discharge pressure of the second compressor, and thus the flow into the auxiliary chambers, is now increased, the high pressure being determined by the back-pressure at the first compressor discharge, being highest with the first spill valve fully closed and at the highest engine speed.

The engine is now operating with both spill valves fully closed, and all of the air available being passed into the cylinders, both through the auxiliary chambers from the second compressor, rammed by the first compressor, and through the inlet ports in the cylinder walls by the first compressor charging the inlet ports. The engine is now operating as a hybrid—approximately one-fourth uniflow (i.e., air flow in a single direction, downward, from the auxiliary chamber intake valves to the exhaust ports) and three-fourths counter-flow (i.e., air flow in a loop, first up and then down, from the inlet ports in the cylinder walls to the exhaust ports).

We come now to Mode III, wherein the cylinders are supercharged to a pressure greater than one-atmosphere to obtain still more output power. Since the exhaust ports in the cylinder walls have access to the atmosphere, the charge of fuel and air filling the cylinder volume at a pressure of something less than one atmosphere is all the charge that can be trapped inside a cylinder by the advancing piston, unless additional air can be forced into that cylinder after its exhaust port is closed. This is done in Mode III by providing late closing of the intake valves into the auxiliary chambers (by mechanism hereinafter described) while raising the air pressure supplied to these intake valves. To raise the air pressure is the reason why the intake of the second compressor is arranged to be rammed by the back-pressure at the discharge of the first compressor.

The back-pressure in a blower-port system, such as that comprising the first blower and the cylinder inlet ports of the engine described, has been found to be approximately exponential; and for all practical purposes, the exponent can be taken as 2. This means that the back-pressure, although very low at idling, is increased approximately four-fold each time the engine speed is doubled. This back-pressure applied to the suction side of the second compressor may raise its discharge pressure to 15 p.s.i.g. (pounds per square inch gauge) or more, and the resulting high pressure is used to force additional air into that already trapped by the piston, and thus effect an appreciable degree of supercharge.

Of course, the higher the discharge pressure of the second compressor, the heavier the charge of air that can be squeezed into the cylinder after the exhaust port has closed, for when the pressure of the charge trapped behind the advancing piston equals this pressure, no more air can flow into the cylinder. For practical reasons, a point of diminishing returns is reached when the increase in power is balanced by the cost in power of pumping the increased air. In practice, the supercharging pressure in the present engines is kept well below this point. By the means described, as much as 20% more air is introduced into the cylinders, which raises the peak output power correspondingly.

While the late intake valve closing can be made correct for peak power conditions, and fixed at this point, this is also the point of greatest dynamic air flow. At lower power outputs and at lower speeds, a fixed valve timing may permit some blow-back to occur, because the air pressures and thus the velocities are less, and these pressures at valve closing under such circumstances may be less than that in the cylinder at the time of this closing. Hence, in the interest of best performance, it has been found advantageous in practice to advance the valve closing for idling and very low powers by as much as 30° from the full power closing. A mechanism (hereinafter described) has been devised for varying the valve timing to suit power, speed, and torque requirements, the timing being continually variable and under control of the accelerator pedal or other speed and power control.

The pump-loop losses being zero, or nearly so, in a two-cycle engine of the type described, the power required for idling is low. For this reason, the I.M.E.P. (indicated mean effective pressure) of the engine is likewise low. It is desirable in the interest of better idling and low-power operation that the I.M.E.P. be raised. This is done by cutting out half of the cylinders, simply by cutting off their fuel supply. In the preferred arrangement illustrated in FIG. 7, two cylinders of a four-cylinder engine are cut out, and the engine idles on the two remaining cylinders, which are connected to the crankshaft 180° out of phase with each other. In the interest of even wear and with special reference to a 90° V-type engine, first one bank and then the other bank of cylinders may be cut out, the changeover being effected each time the engine is idled by an obvious toggle mechanism, which is not illustrated. By this simple means, the I.M.E.P. is doubled for idling and for low-power outputs, and during such operation the engine is at least as smooth in operation as a four-cylinder, four-cycle one. Another feature of the fuel system is that all of the fuel supply to the engine is cut off during deceleration from high speeds, and is reestablished at a low speed, somewhat above idling speed, to obviate stalling.

In all of the foregoing, the combustion of the fuel was taken for granted, and no description was made of the stratification of the charge that is necessary to make the engine operable. This will now be discussed.

The system of charge stratification used in this engine is similar to that described in my United States Patent No. 2,884,913, issued May 5, 1959, and in my United States Patent No. 2,983,268 issued May 9, 1961, except for modifications necessary to make the system applicable to the special type of two-cycle engine herein described. In the four-cycle engine, all of the fuel need not be passed through the intake valves to the auxiliary chambers. When the fuel needed exceeds that which can be handled without causing the stratum at the spark plug to become too rich to burn properly, more fuel, up to that amount needed for full power, can be injected into the inlet ports of the main inlet valves of the four-cycle engine, as described in said patent and application. There being no separate charging stroke on a two-cycle engine, all of the fuel from idling to full power must be passed through the auxiliary chambers. On the other hand, there are no valves in the head of this variety of two-cycle engine (except the intake valves into the auxiliary chambers), so the choice of size, shape and location of the auxiliary chambers can be made more freely to best serve their purposes.

The auxiliary chambers of the two-cycle engine, instead of being elongated, as disclosed in the patent identified above, now become flattened cells. The first cell, instead of discharging into the main chamber through a hole or multiplicity of holes, discharges tangentially into a second cell, also flattened, which discharges into the cylinder with little or no restriction, the second cell being completely open, or almost so, at the center of the cylinder head. By this means, the burning charge driven out of the auxiliary chamber is given a very rapid swirl. The centrifugal force resulting from this swirl forces the heavy components (mostly burning fuel particles) outward, and the light constituents into the center of the resulting vortex. The spinning and burning gases take the form of a spinning disc, thus maintaining a stratum above the balance of the gases (retained exhaust gas and air admitted through the inlet ports) in the cylinder.

When the fuel is injected into the air passage above the intake valve in a continuous stream, the accumulated fuel will all pass into the auxiliary chamber as soon as the valve opens. Of course, the fuel, because it is flowing continuously, together with the air that is also flowing when the valve opens, cannot exceed that which can form an explodable mixture, for this is the last portion of the charge that remains in contact with the spark plug after the valve closes.

In practice, this may limit the peak power obtainable consistent with regular firing without fouling the spark plugs. In order to overcome this limitation, it is sometimes desirable to cut off the fuel while the intake valve is open, but permit it to flow at all other times. This permits pure air to be the last thing admitted before the valve closes. Now the stratum next to the plug may be too lean at times for proper firing. Hence, for best results, it is desirable to time the fuel flow to cut off the fuel just sufficiently late to enrich the stratum of air next to the spark plugs to the correct value for a lean explodable mixture under all operating conditions of speed and power. However, the fuel supply timing to achieve good results is not particularly critical.

The fuel system can take a variety of forms, that preferred being an electrical system with solenoid-operated valves, hereinafter described further. In practice, a system comprising a gear-type fuel pump, a multiplicity of solenoid-operated valves, and a pressure regulator seems to best suit the needs of the subject engine. By using a combination of variable-duration and variable-pressure fluid flow, by means of electrically-operated valves, one for each cylinder, all modes of operation are assured with the least complication and at the least expense.

It should be noted that the choke and accelerating pump needed in conventional engines for enrichment of the fuel during starting and accelerating are absent, for in order to cause the new engine to cold-start and run, it is necessary only to enrich the stratum next to the spark plug, which is done simply by admitting more fuel, up to that amount needed for full power, by depressing the accelerator pedal.

Referring particularly to FIG. 1 of the drawings, which illustrates one embodiment that has been built and operated succesfully, the cylinder 1 is provided with a water jacket 2, at least one air inlet port 3 in the cylinder wall, and at least one exhaust port 4 in the cylinder wall, arranged in the usual manner of a conventional, two-cycle, internal combustion engine. A conventional piston 5 reciprocates within cylinder 1 and is connected to crankshaft 6 through connecting rod 7. As piston 5 reciprocates within the cylinder, it covers and uncovers ports 3 and 4 cyclically, the ports being fully open as the piston reaches bottom dead center. As is usual in the design of two-cycle engines, the exhaust port 4 extends somewhat higher within the cylinder than inlet port 3, so that exhaust port 4 is opened first, during each downward stroke of the piston, to permit "blow down" and the discharge of exhaust gases through exhaust manifold 8 and muffler 9 to the atmosphere. Air is supplied to inlet port 3 through manifold 10 from an air compressor 11, preferably a Roots blower driven by gear or belt connections to the crankshaft. A conventional air cleaner 12 is attached to the intake side of compressor 11. A fragment of the conventional crankcase is shown at 13.

Parts 1 through 13, described above, are substantially the same as corresponding parts of a conventional two-cycle engine heretofore used in a small automobile—only the manifold 10 has been modified to provide two other connections (10' and 10") thereto, which will be described hereinafter, and the Roots blower has been inserted at 11 in place of the air-charging system originally employed in the engine. The engine has been run with only one cylinder in operation, but, of course, better performance is obtained with two or more cylinders.

Figure 2:
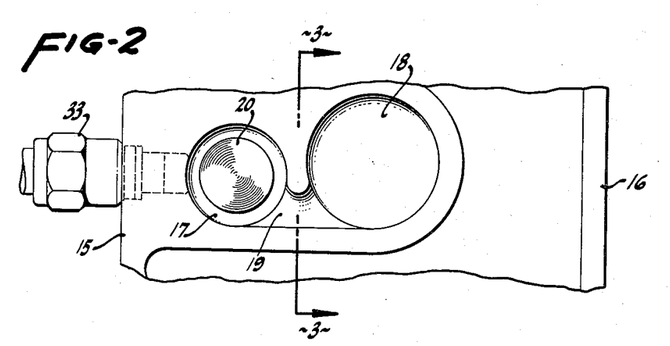
FIG. 2 is a section taken along the line 2—2 of FIG. 1.
Figure 3:
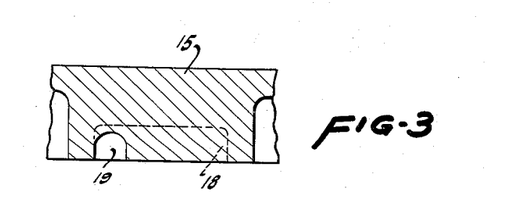
FIG. 3 is a section taken along the line 3—3 of FIG. 2.
Figure 4:
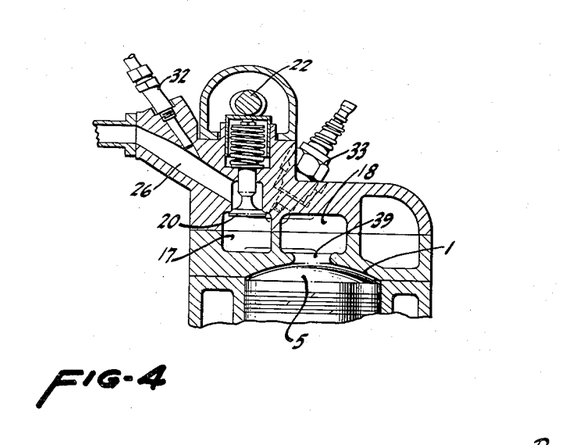
FIG. 4 is a fragmentary section of the upper portion of one cylinder and the cylinder head, showing a modification of the engine illustrated in FIG. 1.

Referring to FIGS. 1, 2, and 3, the original cylinder head of the engine has been replaced with a new head, comprising (for convenience of manufacture) two parts 14 and 15, which are bolted together and to the cylinder block. The section line 2—2 extends along the plane at which the two parts 14 and 15 fit together. The cylinder head is cooled by means of a water jacket 16. This head is provided with cavities defining a plurality of auxiliary chambers, one for each cylinder. Each auxiliary chamber comprises two, side-by-side, hollow cylindrical cells 17 and 18, and an off-center connecting passage 19 extending therebetween and substantially tangential to the cylindrical walls of both cells, as shown. An intake valve 20 opens into the upper end of cell 17, and the bottom end of cell 18 opens into the top end of the cylinder 1. Preferably, cell 18 is coaxial with the cylinder, and substantially the whole bottom end of cell 18 is open into the cylinder; but, if desired, there may be a narrow lip around the bottom of cell 18, as shown in FIG. 4 and hereinafter described.

Valve 20 is operated through conventional mechanism, including a spring 21 which closes the valve and a cam 22 which opens the valve cyclically in synchronism with the reciprocating motion of piston 5. Cam 22 is attached to a conventional camshaft mechanically connected through gears, timing belts, or the like, to rotate in synchronism with crankshaft 6. Preferably, the cam 22 is timed to open valve 20 shortly before piston 5 reaches bottom dead center, and to hold valve 20 open until the top of the piston has passed somewhat above the top of exhaust port 4, for reasons which are more fully discussed hereinafter. A cover 23 encloses the camshaft and cams.

A branch 10' of manifold 10 leads to an air compressor 24, preferably a second Roots blower (or the second section of a two-section blower which serves as both compresssors), which supplies air at a pressure up to about fifteen p.s.i.g. through a manifold 25 to passages 26 in the cylinder head. One passage 26 leads to each intake valve 20, for supplying air through the valve when it is open into cell 17 of the ignition chamber. The amount of air thus introduced through valve 20 during each cycle of operation is varied, as hereinafter described, and in any event fills less than one-third of the cylinder 1, the remainder of the cylinder being filled either with air introduced through inlet port 3 or with retained exhaust gases. By connecting the inlet of compressor 24 to manifold 10, the inlet pressure at the second air compressor equals the atmospheric or somewhat above-atmospheric pressure provided in manifold 10 by the compressor 11, and thereby the compressor 24 supplies a somewhat higher pressure to manifold 25.

Branch 10" of the manifold 10 leads to a first spill valve 27 and through this valve to the atmosphere, or, alternatively, back to the intake side of compressor 11. When valve 27 is fully open, the pressure within the manifold 10 cannot rise substantially above atmospheric, and the amount of air supplied through inlet ports 3 under these conditions is negligible. Because the amount of air introduced through valve 20 fills less than one-third of the cylinder, the major portion of each cylinder remains filled with hot, exhaust gases under this condition of operation. As valve 27 is closed progressively, the pressure within the manifold 10 rises and more air is forced through inlet ports 3 into the cylinders, displacing an essentially equal amount of exhaust gases. When the valve 27 is fully closed, enough air is forced through inlet ports 3 to flush out substantially all of the exhaust gases from each cylinder in each cycle of operation.

A second spill valve 28, likewise leading to the atmosphere, is connected to a branch of manifold 25 for varying the amount of air supplied through intake valves 20. Valve 28 is adjusted so that sufficient air for idling is always available, more air being forced through valves 20 by the closing of valve 28 when the accelerator is depressed for output power.

Fuel for operating the engine is introduced in metered quantities through each of the passages 26 leading to the several cells 17 of the ignition chambers connected to the several cylinders. The fuel system illustrated in FIG. 1 is essentially the same as the fuel system disclosed and described in my U.S. Patent No. 2,884,913. Fuel is pumped from tank 29 by pump 30 to a pressure regulator valve 31, and excess fuel is returned to the fuel tank as indicated in the drawings. Preferably, pump 30 (e.g., a gear-type pump driven by connections to the crankshaft 6) delivers fuel at a rate proportional to the engine speed and substantially equal to the maximum amount of fuel which the engine can use at that speed, so that the engine can never be supplied with more fuel than it can burn completely. The regulator valve 31 supplies fuel at a controlled, adjustable pressure to a nozzle 32 containing a small orifice through which fuel flows at a rate determined by the supply pressure. A separate nozzle 32 is provided for each cylinder, so that the amount of fuel supplied to each cylinder is individually metered and is controlled by the regulator valve 31. Nozzle 32 discharges fuel into passage 26 continuously in the engine illustrated in FIG. 1, and the fuel accumulates behind valve 20 until such time as the valve 20 opens during each operating cycle of the engine. Immediately upon the opening of valve 20, the air flow through passage 26 carries the accumulated fuel into cell 17, where the air and fuel mixture is subsequently ignited by a spark plug 33 arranged with its spark gap adjacent to intake valve 20, as shown.

A mechanical linkage connects pressure regulator valve 31 and spill valves 27 and 28 to one another and to the accelerator pedal or other acceleration control 34 of the automobile, so that a depression of the accelerator pedal adjusts valve 31 to increase the pressure at which fuel is supplied to nozzles 32, and thereby increases the amount of fuel supplied to each cylinder, and progressively closes spill valves 27 and 28 to increase the amount of air supplied into the cylinders. Preferably, the linkage is arranged to close valve 28 fully at and above about one-fourth to one-third of peak engine power, and to leave valve 27 essentially fully open until valve 28 is essentially fully closed. By way of example only, valves 27 and 28 may be mechanically connected to opposite ends of a lever 35, while the accelerator pedal and a spring 36 are connected to intermediate points on the lever as shown. Spring 36 tends to open both valves when the accelerator is released. When the accelerator is depressed, valve 28 will be affected first and will move toward a closed position until its operating arm strikes stop 37. Because valve 28 can move no further, additional depression of the accelerator rotates lever 35 clockwise against the force of spring 36 and moves the operating arm of valve 27 downward from its stop 38, thereby progressively closing valve 27.

When the engine is idling or operating at low power—Mode I operation—spill valve 27 is fully open and, as hereinbefore explained, the amount of air supplied through ports 3 is practically negligible. In idling, spill valve 28 is sufficiently open that just the right amount of air for idling the engine is supplied by compressor 24 through manifold 25, passages 26, and intake valves 20; and regulator valve 31 supplies fuel at a relatively low pressure to nozzles 32, so that just enough fuel to idle the engine flows through the orifices of nozzles 32 into the passages 26 and from there through the intake valves 20 into the auxiliary chambers. Thus, sufficient fuel and air for idling the engine are admitted to each cylinder through the intake valve 20 and the auxiliary chamber 17, 18, 19, each time that intake valve 20 opens—that is, during each operating cycle approximately as the piston 5 passes bottom dead center. This air and fuel mixture fills only a small part of the cylinder 1—in some cases as little as five percent. The remainder of the cylinder is filled with hot exhaust gases from previous cycles, which are retained and recirculated in the cylinder because the gases cannot be expelled through exhaust port 4 until they are replaced by newly-admitted air and fuel. In low-power operation—still Mode I—operation is essentially the same, except that the spill valve 28 is closed to a greater extent while regulator 31 supplies fuel at a somewhat greater pressure, so that more air and fuel—in some cases enough to fill up to one-third of the cylinder volume, are admitted through intake valve 20.

While exhaust port 4 is open, the pressure within the cylinder is substantially atmospheric. As the piston moves upward, it covers, and thereby closes, the exhaust port 4. Valve 20 also closes, and piston 5 continues its upward stroke, compressing all of the gases within the cylinder and auxiliary chamber. Because the fresh air and fuel were admitted through the auxiliary chamber at the top of the cylinder, and were given a rapid rotary motion in passing from one cell to the other of this chamber, it will be found that the gases within the cylinder are stratified—that is, the mixture of fresh air and fuel rests on top of the retained exhaust gases. This stratification is fairly well preserved during the compression stroke and, as a result, the retained exhaust gases largely remain within cylinder 1, while the mixture of newly-admitted air and fuel is largely compressed back into the auxiliary chamber and particularly into cell 17. During this compression process, air is forced from cell 18 through passage 19 back into cell 17. The air entering cell 17 tangential to its cylindrical wall gives the fuel and air mixture within cell 17 a rotary motion, insuring a stratified charge in which the upper layer, adjacent to spark plug 33, is an easily-ignited, somewhat lean mixture.

As the piston approaches top dead center, spark plug 33 is fired in the conventional manner, and ignites the fuel and air mixture within cell 17. The burning fuel and air expands through passage 19 into cell 18, acquiring a rapid rotary motion as it enters cell 18 tangential to its cylindrical walls. From cell 18 the burning mixture expands further downward into cylinder 1, driving piston 5 downward in the power stroke. Any fuel which was initially present in cell 18 or cylinder 1 is speedily ignited by the burning fuel expanding from cell 17, and thus the fuel burns smoothly. The rapid rotary motion of the burning fuel and air helps to maintain the stratification, and the burning fuel and air remains generally above the previously burned exhaust gases. Thus, the combustion space, within which the fuel burns, comprises the ignition chamber and, usually, an upper portion of the cylinder. As the expanding gases drive piston 5 downward, power is delivered through connecting rod 7 and crankshaft 6 to the wheels of the automobile or other load connected to the engine.

As soon as the top of the piston moves down past the top of exhaust port 4, a sufficient amount of the exhaust gas escapes through port 4 to reduce the pressure within the cylinder 1 substantially to atmospheric, and the cycle is completed.

Retention of exhaust gases within the cylinder during idling and low-power operation leads to very important and significant advantages. There is little throttling of the intake air, such as occurs in conventional four-cycle engines, and, in fact, there may be a small supercharge introduced through valve 20, as herein explained. Therefore, fairly high compression ratios are utilized even during idling, which has a very beneficial effect upon fuel economy. Also, the retained exhaust gases are hot, and this in combination with the maintenance of compression ratio insures a high combustion temperature—substantially as high as in full-power operation—even when the engine is idling. This high combustion temperature, together with the stratification described above, which keeps the newly admitted air and fuel mixture in correct proportions within the upper part of the cylinder and in the auxiliary chamber, assures reliable ignition and smooth combustion, and results in smooth idling of the engine at low idling speeds—a desirable result notoriously lacking in ordinary two-cycle engines.

The efficient combustion and the stratification described above insure substantially complete burning of the fuel. What is more, any small part of the newly-admitted fuel which, by chance, may not be burned during the first cycle of operation remains in the cylinder, and will almost surely be burned in a following cycle or cycles before it is exhausted through port 4. Because of the stratification, the newly-admitted air and fuel burns in a layer above the retained exhaust gases. The top layer of these retained gases contains the combustion products of the last preceding cycle of operation. If there is any unburned fuel and air among these products, it is quite likely to be ignited and to burn upon exposure to the heat and pressure generated by the burning layer above. Enough air is admitted, under varying operating conditions, to burn almost all of the fuel.

The absence of large pump losses when idling this engine are also notable. The retained exhaust gases automatically reduce the effective size of the cylinder to the size needed for operation at the desired power level. Except for small heat losses to the cooling system, all of the work expended in compressing the retained gases during the compression stroke is returned to the piston during the power stroke. Because there is little throttling of gases during any part of the operating cycle, the losses which result from throttling are substantially avoided. Use of the spill valve 27 to regulate the amount of air supplied through ports 3 also leads to improved economy. When the spill valve 27 is open, there is little load upon compressor 11, and the only power needed to operate the compressor 11 is that required to supply friction losses—a small fraction of the total power required to operate the compressor under full load.

All of these improvements contribute to fuel economy of the engine. This is particularly important in city driving and in heavy traffic, where much idling and low-power operation are necessary. Furthermore, and even more important, the nearly complete combustion of fuel provides an exceptionally clean exhaust, containing little of the irritating partial products of combustion, i.e., smog, to be found in the exhaust of most gasoline engines, particularly when the engines are idling or operating at low power.

To increase the output power of the engine within the limits of Mode I operation, the fuel pressure is progressively increased by adjustment of regulator valve 31, and the spill valve 28 is progressively closed while spill valve 27 remains fully open. As the fuel pressure increases, fuel flows at a higher rate through the orifices of nozzles 32 and thus supplies more fuel to each cell 17 for operating the engine at a higher speed and a higher power output. As the speed of the engine increases, the speed of compressor 24 (preferably driven by mechanical connections through gears, belts, and the like, to crankshaft 6) also increases, and sufficient fuel and air are supplied through intake valve 20 to operate the engine up to about one-fourth to one-third of the maximum output power of the engine without admitting substantial amounts of air through inlet ports 3. This actually covers the power range usually employed steadily in the operation of an automobile—it is enough power to cruise at a constant speed of, say, sixty miles per hour on a level highway. The additional power must be provided, of course, to cover occasional requirements, particularly fast acceleration, hill-climbing, and the like. The limit of Mode I operation is reached when spill valve 28 is fully closed.

At powers above the limit of Mode I operation, the needed fuel may be supplied through nozzles 32, but sufficient air to operate the engine at such power cannot be supplied through intake valves 20. Under these conditions, spill valve 27 is partially or wholly closed, and the needed amount of additional air to burn the fuel is supplied through inlet ports 3 in the cylinder walls. This is Mode II operation. As valve 27 approaches a fully closed position, the total amount of air admitted through valves 20 and ports 3 drives substantially all of the exhaust gases out through exhaust ports 4, and the whole cylinder is charged with fresh air and fuel in each cycle of operation.

When operating in Mode II, the total amount of fuel per engine cycle supplied through nozzles 32 may be in excess of that which will form an ignitable mixture with the relatively small amount of air that can be admitted through intake valves 20. Nevertheless, ignition takes place reliably over a wide range of fuel supply rates because the fuel is introduced in row, liquid form, there being an accumulation of fuel behind each valve 20 while this valve is closed. Hence, upon the first opening of valve 20 in each operating cycle, the accumulated raw, liquid fuel is immediately dumped into cell 17 and is followed by air and a smaller proportion of fuel (or no fuel). The air continues to flow through valve 20 as long as the valve remains open, and thus provides a relatively lean mixture next to the intake valve 20 and spark plug 33. After valve 20 closes, near the beginning of the compression stroke, air is forced through passage 19 into cell 17 by the upward movement of piston 5, and this air, rotating rapidly in cell 17, together with the fuel and air already in the cell, forms a layer of lean, ignitable mixture in the upper portion of cell 17, under essentially all conditions of operation. When spark plug 33 fires, the lean mixture in the upper part of cell 17 readily ignites and burns very cleanly without any formation of carbon deposits in this region, whereby the spark plug points and intake valves remain exceptionally clean and carbon-free. Carbon deposits may form elsewhere in the auxiliary chamber (which clearly demonstrates the existence of the stratification described) but this is not particularly harmful, and may be actually beneficial.

Any liquid fuel remaiing in the bottom of cell 17 is thrown out violently through passage 19 by the expanding, burning gases, and in the process is ignited, thus introducing into cell 18 a multitude of tiny, burning droplets of liquid fuel. The gases expanding into cell 18, tangential to the cylindrical walls of the cell, take on a rotary motion, which swirls the tiny droplets of burning fuel round and round. As the burning charge expands downward into cylinder 1, it encounters the additional air introduced through port 3, which is always of sufficient quantity to completely burn the fuel.

With spill valve 27 almost or wholly closed, particularly at high engine speeds, there is a considerable rise of pressure in manifold 10 due to resistance to the air flow through ports 3. Because the pressure in manifold 10 is the inlet pressure for the second compressor 24, the pressure supplied to valves 20 by the second compressor rises correspondingly, and may reach 15 p.s.i.g. or more. Now if each of the valves 20 is timed (either by fixed adjustment or variably, as hereinafter described) to close a bit later than the point at which piston 5 closes exhaust port 4 of the same cylinder, the cylinder can be supercharged to a higher-than-atmospheric pressure, whereby more fuel and air can be packed into the cylinder to provide a corresponding increase in power. This is Mode III operation.

FIG. 4 is a fragmentary section showing essentially the same engine as in FIG. 1, except for several modifications, which will here be described. The first modification, shown in FIG. 4, is the provision of a narrow lip or rim 39 around the bottom of cell 18, thereby slightly reducing the diameter of the opening between cell 18 and cylinder 1. This lip may, in some cases, be useful to insure the retention of any liquid fuel droplets within the two cells of the auxiliary chamber until such time as the fuel is all ignited, and to prevent any chance of liquid fuel falling into the cylinder proper before it is ignited. However, experiments to date have indicated that the lip is not usually necessary, and that, in any event, the lip should not be large in relation to the diameter of cell 18, because any great reduction in the size of the opening between cell 18 and the cylinder reduces the maximum power attainable with the engine. When designed as shown in FIG. 1, or with a small lip as shown in FIG. 4, the engine has been demonstrated to operate at maximum power with a B.M.E.P. (brake means effective pressure) of 90 to 100 p.s.i. (pounds per square inch), as compared with a B.M.E.P. of about 80 p.s.i. in a typical two-cycle engine of conventional, prior design. The B.M.E.P. attained with the engine shown is equivalent in power output to a B.M.E.P. of 180 to 200 p.s.i. in a four-cycle engine having the same number of cylinders and the same size, as compared with the B.M.E.P. of about 125 p.s.i. realized in a typical four-cycle engine of conventional design. Hence, it is evident that the present engine produces considerably more power in relation to its size and weight than is the case with prior engines, whether two-cycle or four-cycle.

Another modification shown in FIG. 4 is relocation of the spark plug 33 to a somewhat different position. It will be noticed that in both positions of the spark plug, as shown in FIGS. 1 and 4, the spark gap is adjacent to intake valve 20 and thus is positioned to ignite the mixture in the upper part of cell 17. Also, it will be noted that the piston 5 is shown at approximately top dead center in FIG. 4, and at approximately bottom dead center in FIG. 1.

Figures 5, 6:
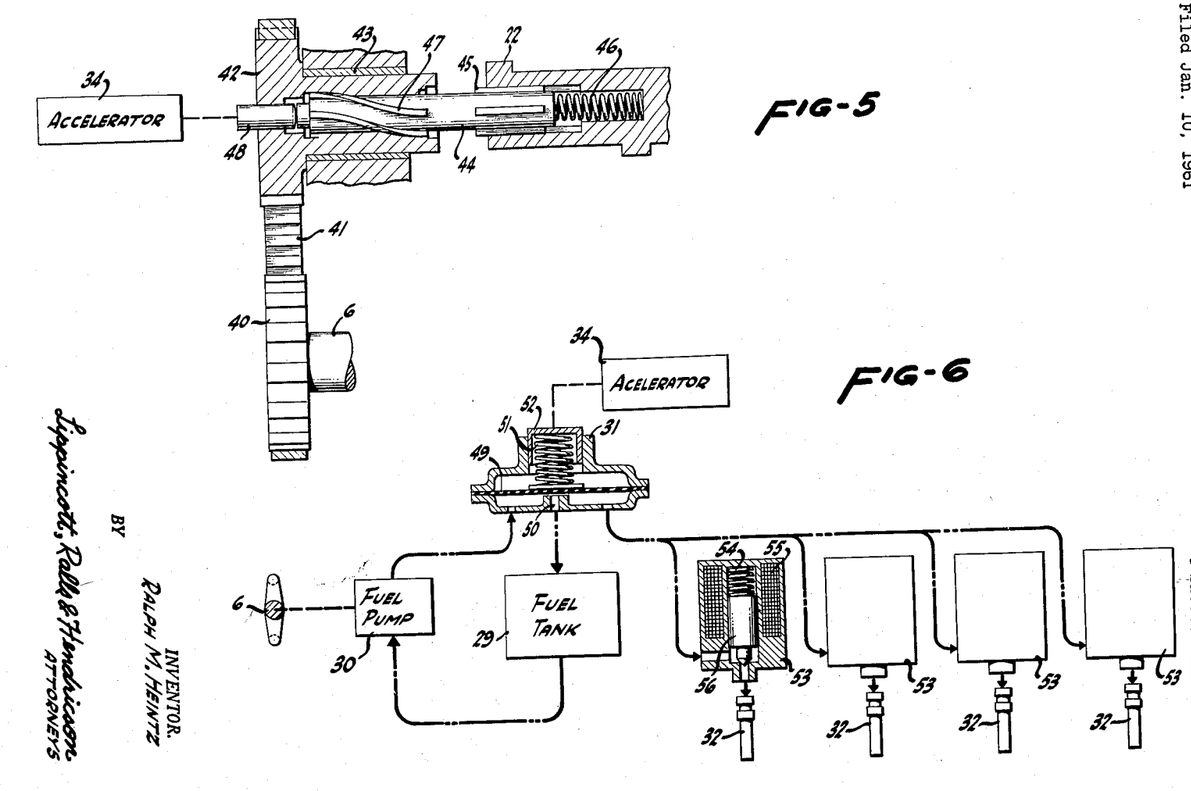
FIG. 5 is a detail, partly in section, showing a preferred mechanism for advancing and retarding the valve timing.
FIG. 6 is a schematic illustrating a preferred fuel supply system.

FIG. 5 shows the mechanism used to vary the valve timing in the engine illustrated in FIG. 4. If desired, the same mechanism can be incorporated into the engine shown in FIG. 1. A gear 40 attached to crankshaft 6 drives a timing belt 41 which rotates a gear 42 supported in a bearing 43. Gear 42 is coaxial with the valve-operating cams 22, and is connected thereto through a shaft 44 provided with external splines at both of its ends. The splines 45 on the right-hand end of shaft 44 (as viewed in the drawing) are straight, and extend parallel to the shaft axis. This end of the splined shaft fits into mating grooved ways, or internal splines, formed in an axial hole extending into the camshaft. Thus, the angular relation between shaft 44 and cams 22 is fixed, and the splined shaft and the cams rotate in unison, but the shaft 44 can move longitudinally relative to the cams. A spring 46 within the axial bore of the camshaft presses shaft 44 toward the left (as viewed in FIG. 5).

The splines 47 on the left-hand end of shaft 44 curve around the shaft, helically, as illustrated. These curved splines fit into similarly curved grooved ways, or internal splines, within an axial hole extending into gear 42. Thus, the angular relation between gear 42 and shaft 44, and hence the angular relation between cams 33 and crankshaft 6, varies with longitudinal movement of shaft 44. A pin 48, which abuts on the left-hand end of shaft 44, is mechanically linked to accelerator 34, so that the shaft 44 is moved longitudinally by movement of the accelerator pedal or equivalent control. Thus, the angular relation between cams 22 and crankshaft 6 is varied as a function of accelerator position. Preferably, the linkage between the accelerator and pin 48, and the curvature of splines 47, are designed to advance the angular position of cams 22, and thus advance the closing of intake valves 20, by as much as 30° for idling of the engine, as compared to the position of the same parts during peak-power operation. Thus, freedom from blow-back while idling or operating at low power is made compatible with late closing of valves 20 for supercharging the cylinders during high-power operation.

Figure 7:
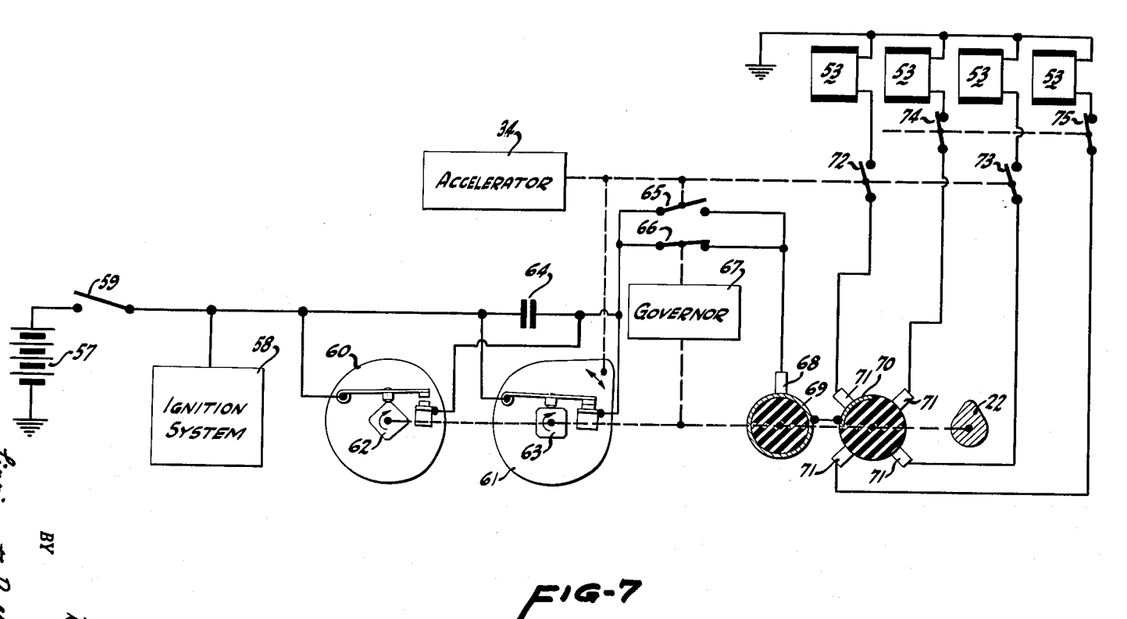
FIG. 7 is a schematic and circuit diagram of the electrical control apparatus for the fuel system.

A preferred fuel system for a four-cylinder engine—the engine shown in FIG. 4—is illustrated in FIGS. 6 and 7. Referring particularly to FIG. 6, liquid fuel, e.g., gasoline, is pumped from tank 29 by fuel pump 30, preferably a gear-type pump driven by connections to the crankshaft 6, which delivers a flow of liquid fuel proportional to the engine speed. The fuel pump delivers the fuel to a pressure regulator valve 31, e.g., one containing a diaphragm 49 so arranged that the fluid pressure tends to push the diaphragm upward to uncover a by-pass or return orifice 50, while a spring 51 tends to push the diaphragm downward to cover the orifice. Thus, the fluid pressure below the diaphagm is controlled by the spring force, which in turn is controlled by the movable cap 52 linked to the accelerator 34. The linkage is so arranged that the fluid pressure increases as the accelerator pedal, or equivalent, is depressed to increase engine power. The excess fuel discharged through orifice 50 is returned to the fuel tank 29 or other fuel reservoir.

The liquid fuel, under controlled pressure, is supplied to four solenoid-operated valves 53, each of which controls the flow of fluid to a different one of the four metering nozzles 32. One metering nozzle 32 is provided for each cylinder. Each valve 53 is biased to a closed position by a spring 54, or the like, whereby fuel flow to all cylinders is cut off whenever the valve solenoids are de-energized. Upon passage of an electric current through solenoid winding 55, the ferro-magnetic core 56 is raised and fuel is allowed to flow to the metering nozzle 32, which supplies fuel to the cylinder at a rate regulated by the controlled pressure provided by regulator valve 31. Valves 53, when open, cause no significant drop in the fuel pressure.

FIG. 7 shows the electrical circuit which controls the opening and closing of the four solenoid-operated valves 53. As noted above, a separate solenoid controls the flow of fuel to the metering nozzle of each cylinder, and fuel can flow to a cylinder only when its solenoid is energized. Electric power is supplied by the conventional automobile battery 57 (or generator, or both), which also connects to the conventional spark-ignition system 58 through the usual ignition switch 59. A pair of circuit breakers, each similar to the breaker used in a conventional automotive ignition system, are provided as shown at 60 and 61. These breakers are opened and closed cyclically by cams 62 and 63 rotated by connections to the cam shaft 22. The two breakers are connected in parallel and are shunted by a capacitor 64 which inhibits sparking between the contacts. Thus, current can pass through the breaker circuit so long as either breaker is closed.

Two switches 65 and 66 are connected in parallel with each other between and in series with the circuit breakers and a distributor which is hereinafter described. Switch 65 is operated by connections to the accelerator, such that switch 65 is closed whenever the accelerator pedal (or equivalent control) is depressed for power output from the engine, and is opened whenever the accelerator pedal is released. Switch 66 is operated by a governor 67, or other device responsive to engine speed, such that switch 66 is opened whenever the engine speed exceeds a selected value somewhat above idling speed, e.g., that engine speed which corresponds to an automobile speed of thirty miles per hour, and is closed whenever the engine slows down to a lesser speed, i.e., approaches idling speed.

The distributor shown comprises a brush 68, in contact with a slip ring 69, and a ninety-degree commutator segment 70, which successively contacts four brushes 71 spaced at ninety degree intervals. Slip ring 69 and commutator segment 70 are electrically connected together and mounted on an insulated shaft connected to rotate synchronously with the intake valve cams 22. The four brushes 71 are connected to the four solenoids 53 through four switches 72, 73, 74, and 75, having a function hereinafter described. For the moment, it suffices to say that all four of the switches 72 through 75 are closed with the accelerator pedal depressed.

The circuit breakers 60 and 61 open and close four times per operating cycle of the engine, and thus supply four voltage pulses per cycle to brush 68. During each engine cycle, the distributor connects brush 68 to each of the four brushes 71 in succession, whereby the four voltage pulses in each cycle are routed to respective ones of the four brushes 71. Thus, when all four of the switches 72 through 75 are closed, the four solenoids 53 are briefly energized in turn, and fuel flows for a brief period through each of the four metering nozzles 32, thus supplying fuel to each of the four cylinders, in succession, once per operating cycle of the engine.

The number of degrees of each engine cycle over which each valve 53 will be open, to permit fuel flow through the associated nozzle 32, is controlled by the duration of the electric pulses supplied by the circuit breakers, and this in turn depends on the timing relation between breakers 60 and 61. The operating cams 62 and 63 rotate in unison (they may, in fact, be one), and the breaker arms are set in such angular relation to the cams that breaker 60 closes first, then breaker 61 closes while 60 remains closed, then breaker 60 opens, and finally breaker 61 opens. Hence, each voltage pulse begins at, and the start of fuel flow through a nozzle 32 is controlled by, the closing of breaker 60; and each voltage pulse ends at, and the interruption of fuel flow through a nozzle 32 is controlled by, the opening of breaker 61. Further, by varying the angular position of the breaker arm of breaker 61 only (the mechanism is the same as that used to advance and retard the spark in a conventional automotive ignition system), it is possible to vary the duration of each voltage pulse, and hence the timing of the interruption of fuel flow through each nozzle 32 relative to the closing of the corresponding intake valve 20. For this purpose, the angular position of breaker 61 is adjusted by linkage to the accelerator so that the closing of breaker 61 is advanced (shorter voltage pulses and earlier cut-off of fuel flow to prevent over-enrichment of the mixture at the spark plug) as the accelerator is depressed for greater output power, and is retarded as the accelerator is released.

As noted previously, switch 65 is closed only when the accelerator is depressed, and switch 66 is closed only at speeds below about thirty miles per hour. Hence, when the accelerator is released for deceleration while moving at high speed, both switches 65 and 66 are opened, and the fuel supply to all cylinders is cut off. This not only saves fuel, it also provides faster deceleration and eliminates any objectionable exhaust fumes which might otherwise be expelled at this time. As soon as the speed falls below about thirty miles per hour, governor 67 closes switch 66 and the fuel supply is re-established, to at least a portion of the cylinders, to prevent stalling.

The mechanism for cutting off the fuel supply to half of the cylinders while the engine is idling will now be described. This is accomplished by means of the switches 72 and 73, which are linked to the accelerator so that these switches are closed only when the accelerator pedal, or equivalent control, is depressed. Hence, when the accelerator is released, as for idling, switches 72 and 73 are opened, breaking the circuit to two of the solenoids 53 and thus cutting off the fuel supply to two of the four cylinders. Switches 74 and 75 are provided so that, by connecting these switches instead of switches 72 and 73 to the accelerator, the other two cylinders may be the ones cut off during idling. To equalize wear on the cylinders, the linkage from the accelerator can be periodically changed, automatically or otherwise, from switches 72 and 73 to switches 74 and 75, and vice versa, alternately.

The embodiments illustrated and described in detail are to be taken as examples only, and it will be understood that numerous changes and modifications can be made within the scope of the invention as defined by the following claims. What is claimed is:

1. The method of operating an internal combustion engine having at least one piston that reciprocates within a cylinder provided with air inlet and exhaust ports that are covered and uncovered cyclically as the piston reciprocates, a head defining a combustion space at one end of the cylinder, and an intake valve in said head, said method comprising the steps of admitting through said intake valve a controlled variable quantity of fuel proportional to the variable power output of the engine, admitting through said intake valve sufficient air to burn completely all of the fuel admitted during idling and low-power operation of the engine, the air so admitted through the intake valve being insufficient to fill the cylinder, admitting a negligible quantity of air through said inlet port during idling and low-power operation, whereby hot exhaust gases are retained and recirculated within the cylinder, and admitting through said inlet port additional air sufficient for completely burning all of the fuel during higher power operation of the engine.

2. The method as in claim 1, wherein the maximum amount of air admitted through said intake valve is sufficient to fill no more than one-third of the cylinder, and the amount of air admitted through said inlet port varies from substantially none while the engine is idling to enough for completely scavenging exhaust gases by filling the cylinder with fresh air while the engine operates at high output power.

3. The method as in claim 1, which additionally comprises admitting compressed air through said intake valve for a time after the piston covers the air inlet and exhaust ports during each compression stroke, whereby the cylinder is supercharged.

4. The method as in claim 1, wherein the step of admitting fuel comprises providing a flow of liquid fuel to the intake valve while that valve is closed, causing said fuel to accumulate at the closed intake valve, admitting the so-accumulated liquid fuel to the combustion space upon the opening of said valve, and interrupting said flow of fuel while said valve is open to permit a flow of essentially fuel-free air through the valve following the admission of fuel.

5. The method as in claim 4, which additionally comprises retarding the interruption of said fuel flow relative to the opening of said valve as the amount of fuel supplied and the output power are reduced, whereby the last portion of the charge admitted through the valve forms an explodable mixture under all operating conditions.

6. A stratified charge, recirculated exhaust, two-cycle internal combustion engine comprising at least one cylinder, a piston reciprocating therein, said cylinder being provided with air inlet and exhaust ports that are covered and uncovered cyclically as said piston reciprocates, a head defining a space at one end of said cylinder between the head and the piston, said head being provided with a cavity defining an auxiliary chamber opening into said space, an intake valve arranged in said head and opening into said auxiliary chamber, means for opening and closing said intake valve cyclically as the piston reciprocates, means for supplying controlled variable amounts of liquid fuel and air through said intake valve into said auxiliary chamber, a spark plug arranged to ignite the mixture of fuel and air in said auxiliary chamber, and means for supplying controlled variable amounts of additional air through said inlet port into the cylinder.

7. A recirculated exhaust, internal combustion engine comprising at least one cylinder, a piston reciprocating therein, said cylinder being provided with air inlet and exhaust ports that are covered and uncovered cyclically as said piston reciprocates, a head at one end of said cylinder, an intake valve in said head, means for opening and closing said intake valve cyclically as the piston reciprocates, means for supplying controlled variable amounts of fuel and air through said intake valve, and means for supplying controlled variable amounts of additional air through said inlet port, the last-mentioned means comprising a first spill valve, and a first air compressor connected to supply air to said inlet port and said first spill valve in parallel, whereby the air flow through the inlet ports is least when the first spill valve is fully open, and is greatest when the first spill valve is fully closed, and whereby the first compressor is essentially unloaded and consumes minimum power when the first spill valve is fully open.

8. An engine as in claim 7, wherein the means for supplying variable amounts of air through the intake valve comprises a second air compressor connected in tandem to the first air compressor so that the back pressure at the output of the first compressor, which rises as the first spill valve is closed and as the engine speed increases, is the input pressure to the second compressor, whereby the output pressure of the second compressor is increased correspondingly, particularly during high-power, high-speed operation of the engine.

9. An engine as in claim 7, wherein the means for supplying variable amounts of air through the intake valve comprises a second spill valve, and a second air compressor connected to supply air to the intake valve and said second spill valve in parallel, whereby the air flow through the intake valve is least when the second spill valve is most open, and is greatest when the second spill valve is fully closed.

10. An engine as in claim 9, additionally comprising an accelerator, means controlled by said accelerator for varying the amount of fuel supplied through the intake valve, accelerator-controlled means for operating the second spill valve from essentially open while the engine idles to fully closed at and above a fraction of the peak output power of the engine, and accelerator-controlled means for operating the first spill valve from fully open at and below said fraction to fully closed at the peak output power of the engine.

11. A supercharged, two-cycle internal combustion engine, comprising at least one cylinder, a piston reciprocating therein, said cylinder being provided with air inlet and exhaust ports that are covered and uncovered cyclically as said piston reciprocates, a head at one end of said cylinder, an intake valve in said head, valve operating means for opening and closing said intake valve cyclically as the piston reciprocates, means for supplying controlled variable amounts of fuel and air through said intake valve, means for supplying controlled variable amounts of additional air through said inlet port, said valve operating means being timed to close said intake valve after the piston closes the inlet and exhaust ports in each cycle, at least while the engine is operating at peak power, and means for increasing the pressure of the air supplied through said intake valve as the speed and output power of the engine increase, whereby the cylinder is supercharged for high power operation.

12. An engine as in claim 11, additionally comprising means for automatically advancing the closing of the intake valve as power is reduced, whereby "blow-back" during idling and low-power operation is avoided.

13. An engine as in claim 6, said auxiliary chamber being formed of first and second side-by-side hollow cylindrical cells and a connecting passage extending therebetween and substantially tangential to the cylindrical walls of both cells, so that air passing through said passage from either cell to the other enters the receiving cell tangential to its cylindrical wall, whereby a rapid rotary motion is imparted to the air in both cells, the intake valve opening into one end of said first cell, said second cell having an end opening into the cylinder.

14. A stratified charge internal combustion engine, comprising at least one cylinder, a piston reciprocating therein, a head defining a space at one end of said cylinder between the head and the piston, said head being provided with a cavity defining an auxiliary chamber, said cavity being formed of first and second side-by-side hollow cylindrical cells and a connecting passage extending therebetween and substantially tangential to the cylindrical walls of both cells, so that air passing through said passage from either cell to the other enters the receiving cell tangential to its cylindrical wall, whereby a rapid rotary motion is imparted to the air in both cells, an intake valve arranged in said head and opening into one end of said first cell, said second cell having an end opening into the cylinder, means for supplying fuel and air through said intake valve, and means for igniting the mixture of fuel and air within said first cell.

15. In a stratified charge internal combustion engine having an intake valve that opens and closes cyclically and an air supply passage leading directly to said valve, a fuel supply system comprising a fuel supply passage opening into said air supply passage adjacent to said valve, means for providing a flow of fuel through said fuel supply passage while said valve is closed, and means for automatically interrupting said flow of fuel while said valve is open, whereby fuel accumulates behind the closed intake valve, and the so-accumulated fuel passes through the intake valve when it opens and is followed by essentially fuel-free air.

16. A fuel supply system as in claim 15, additionally comprising means for automatically advancing the interruption of said flow of fuel relative to the opening of the intake valve as the quantity of fuel supplied and the output power of the engine increase.

17. In a fuel supply system for multi-cylinder internal combustion engines, having a plurality of fuel metering nozzles, each supplying fuel to a different cylinder, a plurality of electrically controlled valves, each connected in series with a different one of said nozzles for selectively permitting or interrupting the flow of fuel thereto, means for supplying liquid fuel under pressure to said valves; electrical circuit means for actuating said valves sequentially, comprising a voltage source, at least a first circuit breaker connected to said source, means operating said first breaker synchronously with the engine to provide a succession of electric pulses, a distributor connected between the first breaker and the valves, and means operating the distributor synchronously with the engine for routing successive electric pulses to different valves, whereby the metering nozzles supply controlled amounts of fuel to each of the cylinders in sequence.

18. A fuel supply system as in claim 17, additionally comprising a second circuit breaker connected in parallel with the first breaker, means operating said second breaker synchronously with the engine, and means for selectively advancing and retarding the timing of the second breaker relative to the first, whereby the duration of each electric pulse is variable for controlling the number of degrees in each cycle that the valves will remain open.

19. A fuel supply system for multi-cylinder internal combustion engines, a plurality of fuel metering nozzles, each supplying fuel to a different cylinder, a plurality of electrically controlled valves, each connected in series with a different one of said nozzles for selectively permitting or interrupting the flow of fuel thereto, means for supplying liquid fuel under pressure to said valves, electrical circuit means for actuating said valves sequentially, whereby the metering nozzles supply controlled amounts of fuel to each of the cylinders in sequence, an accelerator, means operated by said accelerator for varying the pressure of the fuel supplied to the nozzles for controlling the output power of the engine, and accelerator-operated means for automatically breaking the electrical connections to a portion of the valves while the engine is idling, whereby the fuel supply to a portion of the cylinders is cut off during idling.

20. A fuel supply system for multi-cylinder internal combustion engines, comprising a plurality of fuel metering nozzles, each supplying fuel to a different cylinder, a plurality of electrically controlled valves, each connected in series with a different one of said nozzles for selectively permitting or interrupting the flow of fuel thereto, means for supplying liquid fuel under pressure to said valves, electrical circuit means for actuating said valves sequentially, whereby the metering nozzles supply controlled amounts of fuel to each of the cylinders in sequence, an accelerator, means operated by said accelerator for varying the pressure of the fuel supplied to the nozzles for controlling the output power of the engine, first and second electrical switches connected in parallel with each other and in series with the distributor and breaker, so that the circuit to all valves is broken and the fuel supply to all cylinders is cut off whenever both switches are open, accelerator-operated means for automatically closing said first switch whenever the accelerator is depressed for substantial output power and automatically opening said first switch whenever the accelerator is released, and means responsive to engine speed for automatically closing said second switch whenever the engine speed falls below a selected value and automatically opening said second switch whenever the engine speed exceeds said value, whereby the fuel supply to all cylinders is cut off whenever the accelerator is released for deceleration from high speeds, and the fuel supply to at least a portion of the cylinders is re-established at a lower speed to prevent stalling.

References Cited in the file of this patent

UNITED STATES PATENTS

| | | |
|---|---|---|
| 1,541,207 | Burtnett | June 9, 1925 |
| 1,661,738 | Rymer | Mar. 6, 1928 |
| 2,121,920 | Mallory | June 28, 1938 |
| 2,314,175 | Summers | Mar. 16, 1943 |
| 2,884,913 | Heintz | May 5, 1959 |
| 2,980,090 | Sutton et al. | Apr. 18, 1961 |